United States Patent [19]
Sepponen

[11] Patent Number: 5,787,340
[45] Date of Patent: Jul. 28, 1998

[54] RADIATION SHIELDING APPARATUS FOR COMMUNICATION DEVICE

[75] Inventor: Raimo Erik Sepponen, Helsinki, Finland

[73] Assignee: Nokia Mobile Phones, Salo, Finland

[21] Appl. No.: 507,346

[22] PCT Filed: Feb. 15, 1994

[86] PCT No.: PCT/FI94/00063

§ 371 Date: Aug. 15, 1995

§ 102(e) Date: Aug. 15, 1995

[87] PCT Pub. No.: WO94/18817

PCT Pub. Date: Aug. 18, 1994

[30] Foreign Application Priority Data

Feb. 15, 1993 [FI] Finland .................................. 930646

[51] Int. Cl.⁶ .................................................. H04B 1/38
[52] U.S. Cl. .............................. 455/90; 455/117; 455/128
[58] Field of Search ........................... 455/347, 300, 455/348, 351, 117, 128, 129, 95, 100; 379/428, 430, 433, 437, 447, 440, 452, 451, 455, 426, 446, 449; 343/841, 702, 718; 250/515.1; 174/35 R

[56] References Cited

U.S. PATENT DOCUMENTS 3,435,456   3/1969   Robb ........................................ 343/702
5,150,282   9/1992   Tomura et al. ........................... 455/300
5,151,946   9/1992   Martensson ............................. 379/433
5,335,366   8/1994   Daniels ..................................... 455/89
5,336,896   8/1994   Katz ......................................... 455/90
5,444,866   8/1995   Cykiert .................................... 455/89

FOREIGN PATENT DOCUMENTS 2022958    2/1992   Canada .
59-92629   5/1984   Japan .
3238936   10/1991   Japan .
4220851    8/1992   Japan .
2240782    2/1991   United Kingdom .

OTHER PUBLICATIONS

Article "Shielding Against Electromagnetic Interference" published in the Mar./Apr. 1979 issue of Platics Design Form.

Primary Examiner—Nguyen Vo
Attorney, Agent, or Firm—Reising, Ethington, Learman & McCulloch

[57] ABSTRACT

A device for radio communication (PH), such as for example radiophone, includes a shielding layer (RFS) which under operating conditions is between the antenna and the user. The shielding layer (RFS) reduces electromagnetic irradiation of the user. The shielding layer (RFS) may be movable in such a manner that it serves a cover of some operational device such as for example the headphone, display and keyboard of the apparatus when it is not use.

28 Claims, 6 Drawing Sheets

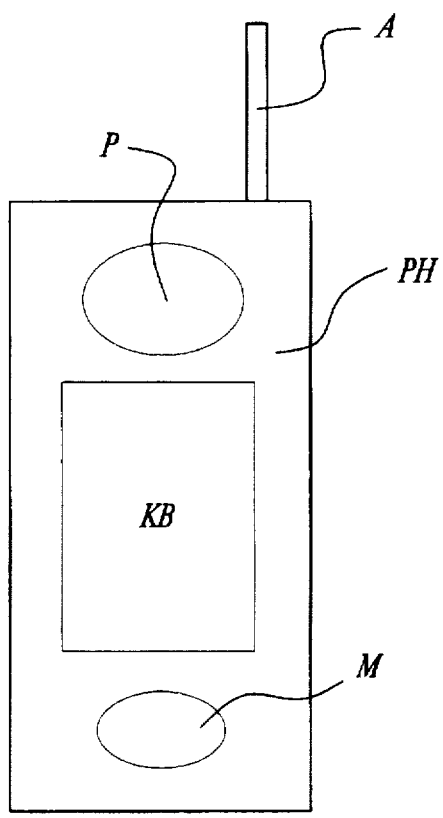
*Fig-1*
PRIOR ART
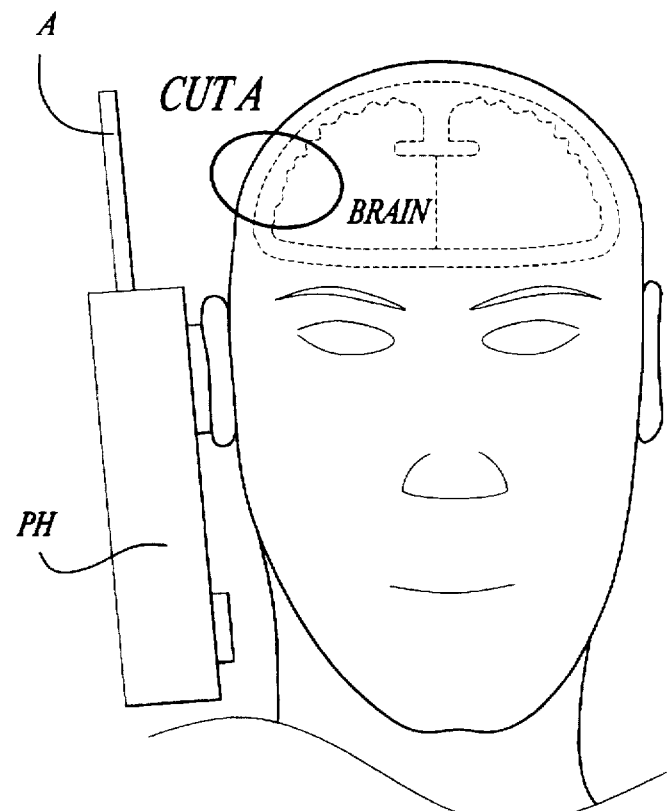
*Fig-2*
PRIOR ART
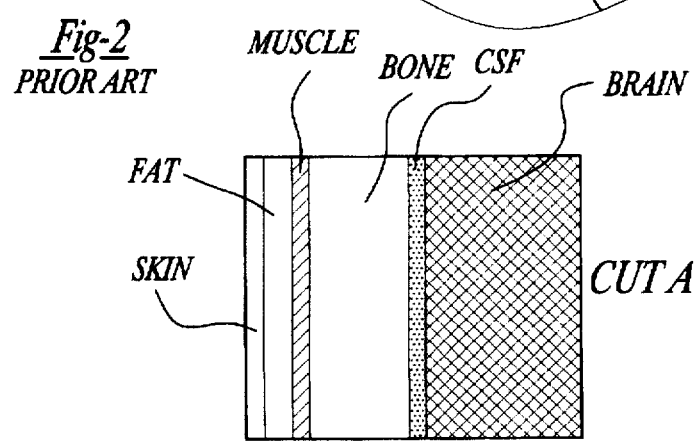

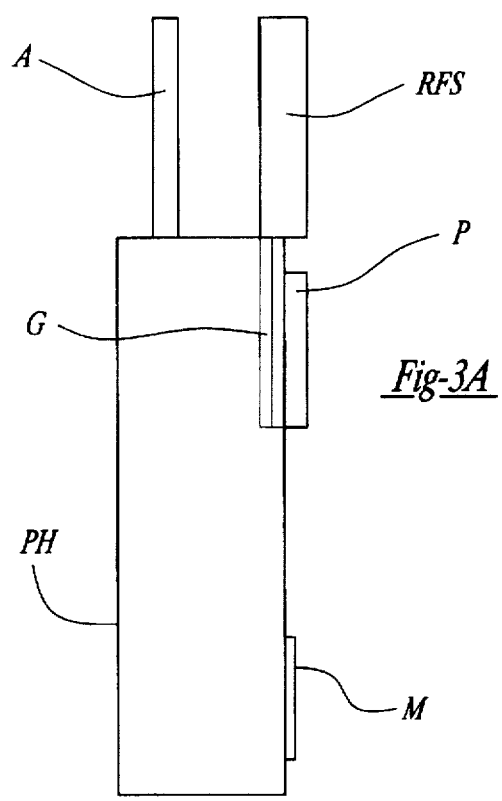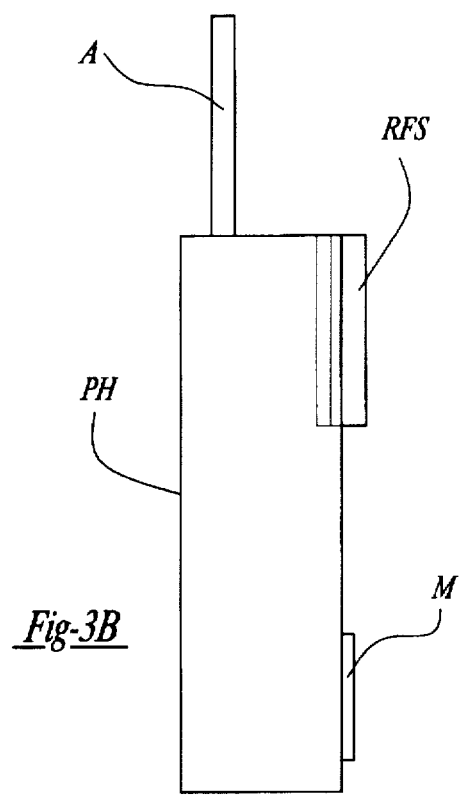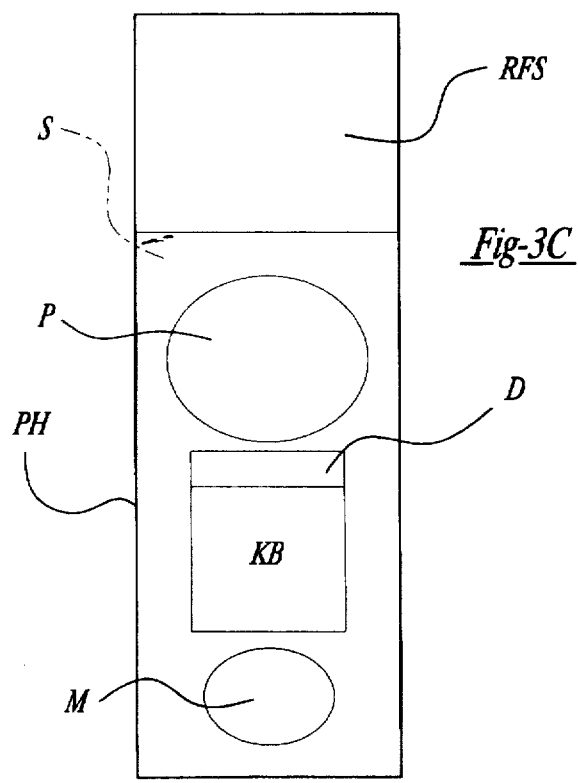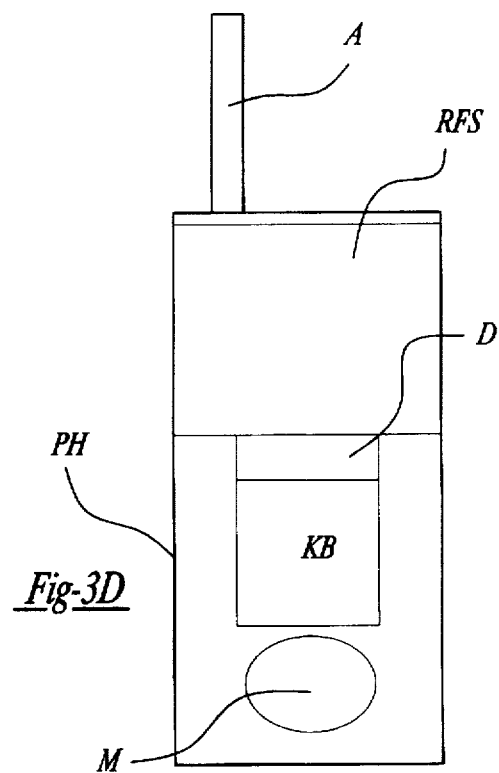

CUT A-A

RADIATION SHIELDING APPARATUS FOR COMMUNICATION DEVICE

The present invention relates to an apparatus for radio communication, such as for example a radiophone.

The popularity of radiophones has been rapidly increasing during the last ten years. At the same time a belief of potential health hazards related to non-ionizing radiation has been increasing. The power radiated by a radiophone is relatively low, typically few hundred milli-watts. On the other hand the antenna means of radiophones are few centimeters from the brain, the hearing organs and the organ of equilibrium. Although a direct heating effect could be left without further consideration it has been suggested that modulated radio frequency radiation induces changes in the electrical status i.e. in the ion balance of nerve cells. A continuous localized exposure to radio frequency irradiation has been suggested to weaken myelin sheets of cells and to eventually lead to an impairment of hearing capability, vertigo etc.. It has been suggested that radio frequency irradiation may stimulate extra growth among supportive cells in the nerve system, which in the worst case it has been suggested could to a development of malignant tumor e.g. glioma from supportive cells. Although the consequences described above have not been scientifically verified, the uncertainty has some effects e.g. by reducing the speed of growth of the market of radiophones.

The invention avoids the drawbacks of the prior art and reduces the irradiation of the user, especially the brain and the nerve tissues. The invention and corresponding apparatus based thereon are characteized by what is set forth in the characterizing sections of the annexed claims.

The invention will now be described in more detail with reference made to the accompanying drawings, in which:

FIG. 1 shows the main features of a radiophone of the prior art.

FIG. 2 shows schematically the position of a radiophone relative to the users head and lists major tissues which are penetrated by electromagnetic radiation emitted by the radiophone.

FIG. 3a–3d show a radiophone of the invention.

FIG. 5a–5d show a construction of the shielding layer of a radiophone of the invention.

Figure 4:
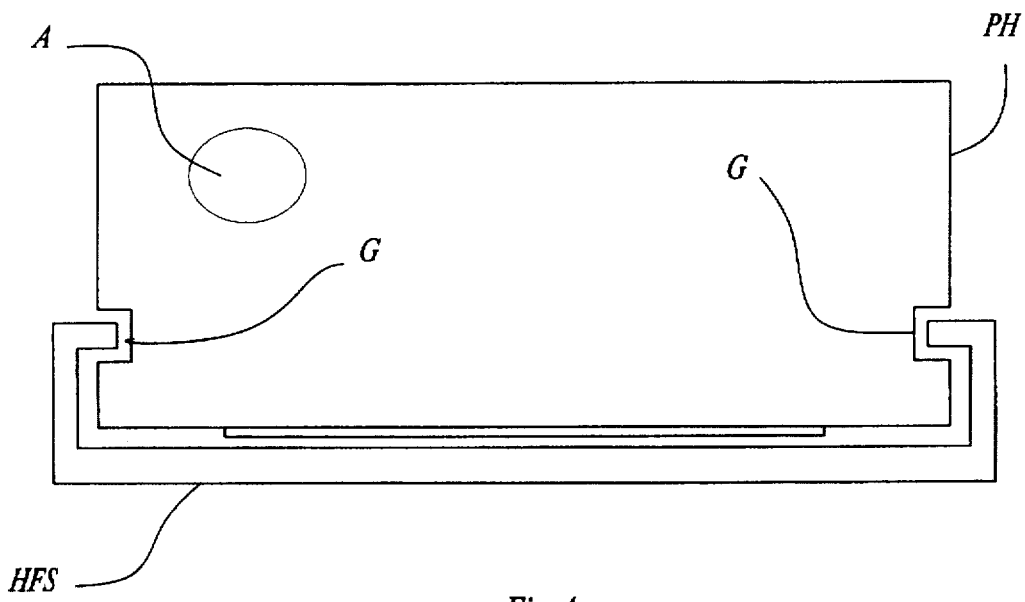
FIG. 4 shows a detail of a radiophone of the invention looked from the side of the antenna.

FIG. 1 shows the most prominent parts of a radiophone which are visible from outside: A is antenna, which is typically so called helix type. In the most radiophones the antenna is covered with rubberlike material with carefully selected electrical properties. When the radiophone is not to be used the antenna may be positioned at least partially inside the body of the radiophone. In some devices the part which is left outside is also designed to operate as an antenna with reduced radiation efficiency and reception sensitivity.

The following parts are also visible: M is a microphone, P is a headphone and KB is a keyboard.

FIG. 2 shows schematically a position of antenna A of radiophone PH relative to brain BRAIN. The view CUT A is shown in the lower section of the figure. As shown in the figure, the power radiated by A is first penetrating a thin skin layer SKIN and thereafter a fat layer FAT. Either of these layer does not significantly attenuate or reflect electromagnetic, radiation. A muscle layer MUSCLE of the head in relatively thin, therefore this layer does not markedly attenuate the penetrating power. Bone and bone marrow do not significantly attenuate penetrating radiation, although this layer is relatively thick. It has been suggested that most of the incoming energy is absorbed by cerebrospinal fluid CSF and brain tissue BRAIN. CSF layer is usually thin. Because antenna A is very close to brain tissue and the distance is much shorter than the wavelength of usually used electromagnetic oscillation, it has been suggested that the irradiation of brain tissue is rather significant.

FIG. 3 shows one solution of the invention to reduce the coupling between antenna A and tissues of user. There are guides G in the body of apparatus PH and a shielding layer RFS which slides along C. When PH is to be used, RFS is at the upper position as shown in FIG. 3d. RFS is between the radiating part of the antenna means and the user. When PH is not to be used, RFS is at the lower position as shown in FIG. 3b. In order to enforce the use of RFS, RFS is arrange to cover phone P as PH is not to be used. RFS may cover also the display D and the keyboard KB of PH. One possibility is that P is attached to RFS and it moves to the using position with the RFS. FIG. 3c shows the frontview of PH in the same situation as FIG. 3a. FIG. 3d shows the frontview of PH in the same situation as FIG. 3b.

RFS may be manufactured from electrically conductive plastic or plastic which is covered with a conductive layer or plastic sheet with a conductive layer inside or just metal. The conductive layer may be slitted, a mesh, or solid. The operation may be easily understood. A part of the power radiated by A is reflected by the conductive surface of RFS and the electric field is coupled via RFS to the electrical ground of PH. The coupling between the electrical ground and RFS assumes a connection at the operation frequency between the ground and RFS. RFS affects the properties of antenna means A and this effect must be taken in the account in the design of the antenna means. The shielding effect of RFS improves the operation conditions of the antenna means because the loading effect of tissues is small.

FIG. 4. shows one embodiment of the invention for RFS. The guides G are grooves in the body of PH. RFS glides up and down along G. Obviously one may construct means e.g. flexible springs which lock RFS in the operational and resting positions. There may also be microswitches, which enable the use of PH only when RFS is in the operational position.

Figure 5A:
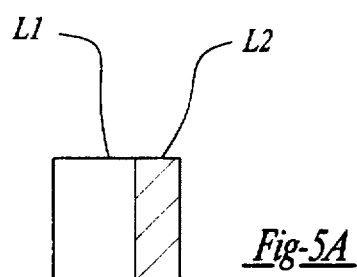

FIG. 5a shows one possible construction of RFS. L1 is a layer which has electrical characteristics different from those of layer L2. L2 may be a reflective, conductive layer and L1 is from some material which has a high dielectric constant (e.g. ceramics) and/or a high permeability (e.g. ferrite), which changes the wavelength so that the reflection from the layer L2 is as efficient as possible. Because of this the operation conditions of the antenna means are improved and the irradiation of the user is reduced.

Figure 5B:
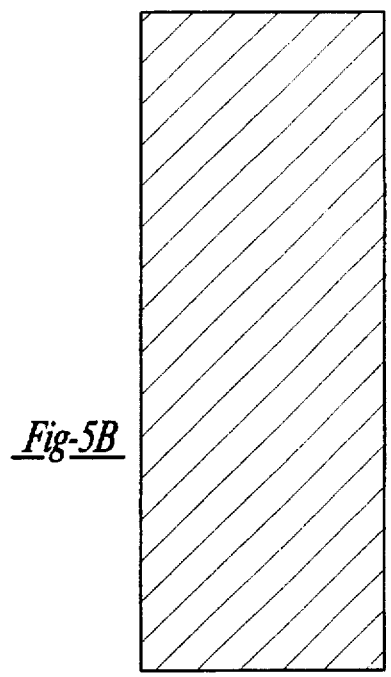

FIG. 5b shows an embodiment, in which RFS is constructed from material, like a composition of plastic and graphite, which absorbs energy radiated by the antenna.

Figure 6:
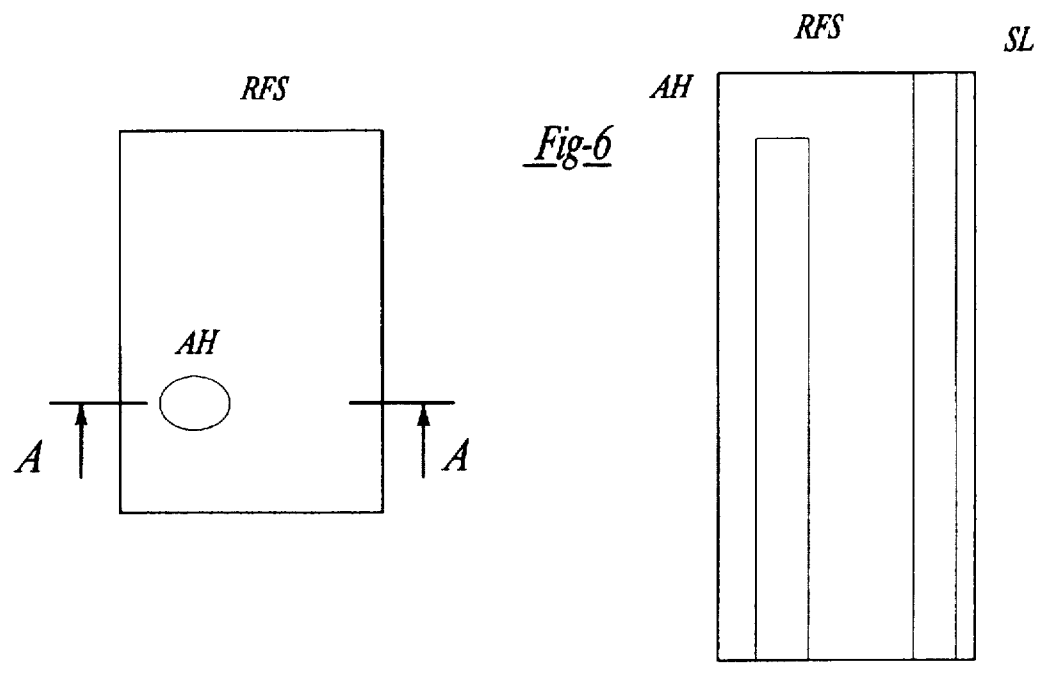
FIG. 6 shows another construction of the shielding layer of a radiophone of the invention.

FIG. 6 shows one embodiment of the invention which enables a reduction of the irradiation generated by apparatus already in the market. RFS is positioned over the antenna so that the antenna is fixed on the antenna support, AH and SL, the shielding part of RFS is placed between the antenna and the user.

Figure 7:
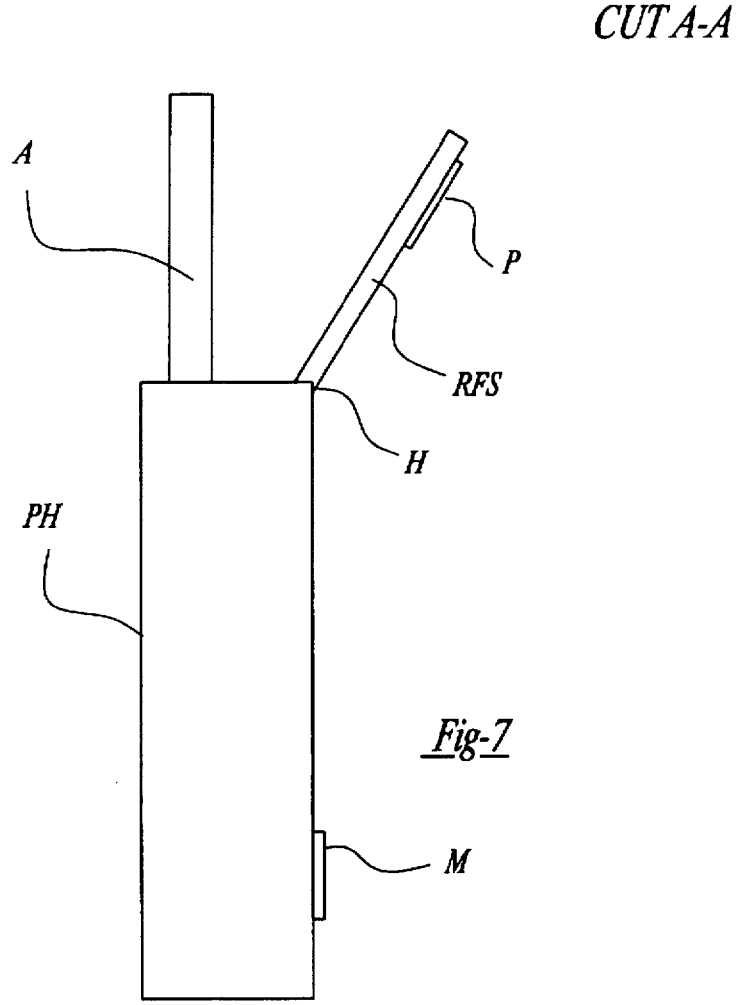
FIG. 7 shows another radiophone of the invention.

FIG. 7 shows RFS which moves guided by the hinges H in the using position. In this case RFS may form a part of the protective cover of PH.

Figure 8A:
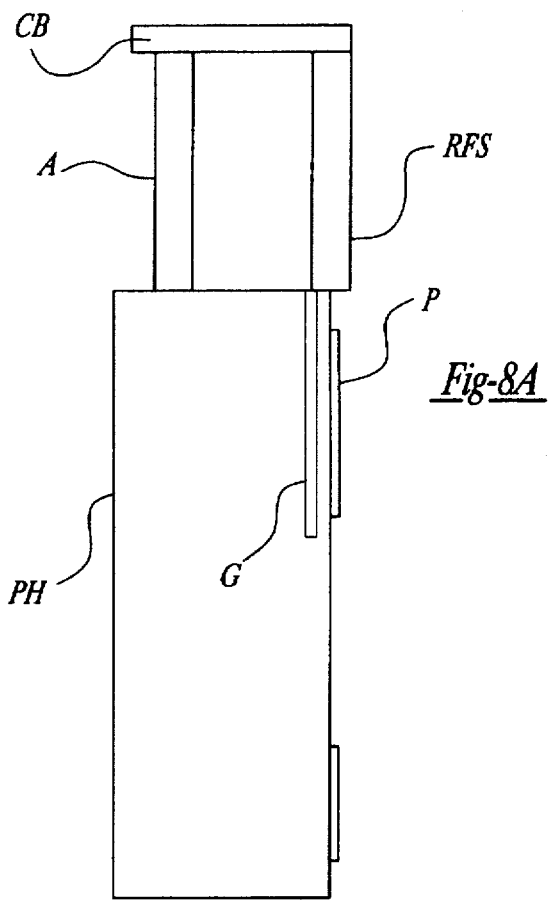
FIG. 8a–8b show third radiophone of the invention.
Figure 8B:
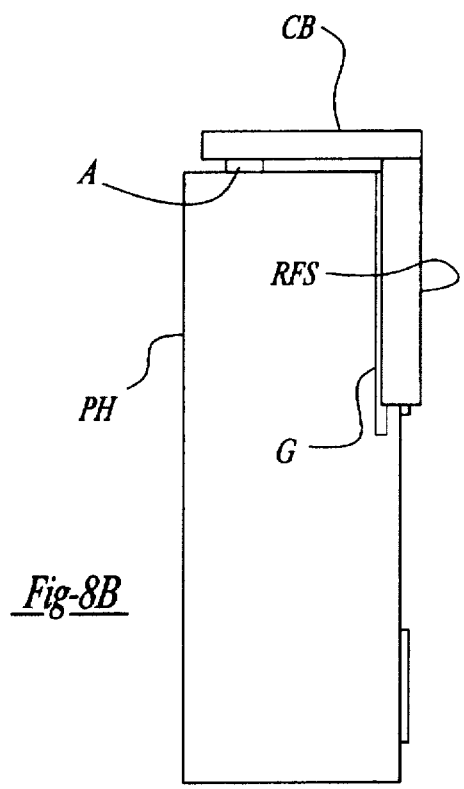

FIG. 8 shows one embodiment of the invention, where RFS and A are mechanically connected with a bar or a plate CB. As A is moved to the operational position, RFS moves simultaneously to the operational position (FIG. 8a). FIG. 8b shows A and RFS in the resting position.

Figure 9A:
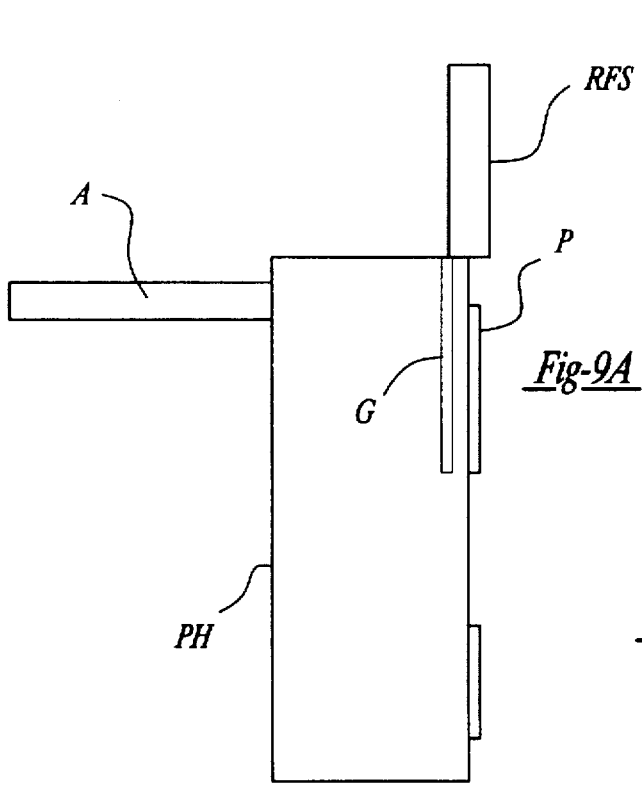
FIG. 9a–9b show fourth radiophone of the invention.
Figure 9B:
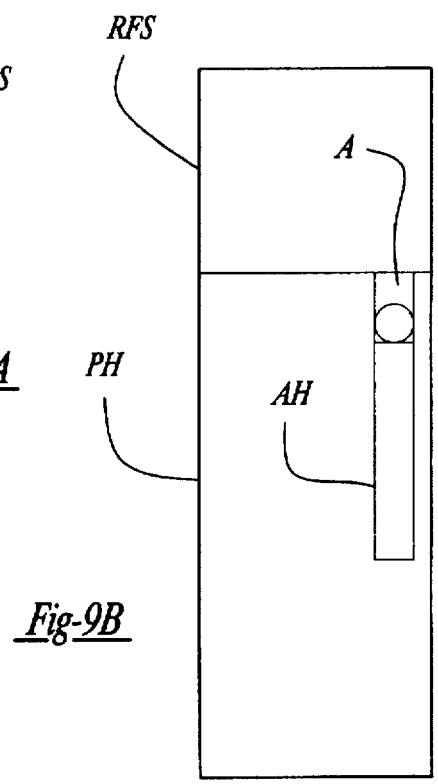

FIG. 9a shows a side view of PH, where A in the operational position is unconventionally directed away from the user. RFS reduces the amount of power absorbed by the user. FIG. 9b shows the rear view of PH. When not used, A is in the antenna holder AH, from where A is at first pulled out and then turned in the using position.

Figure 10:
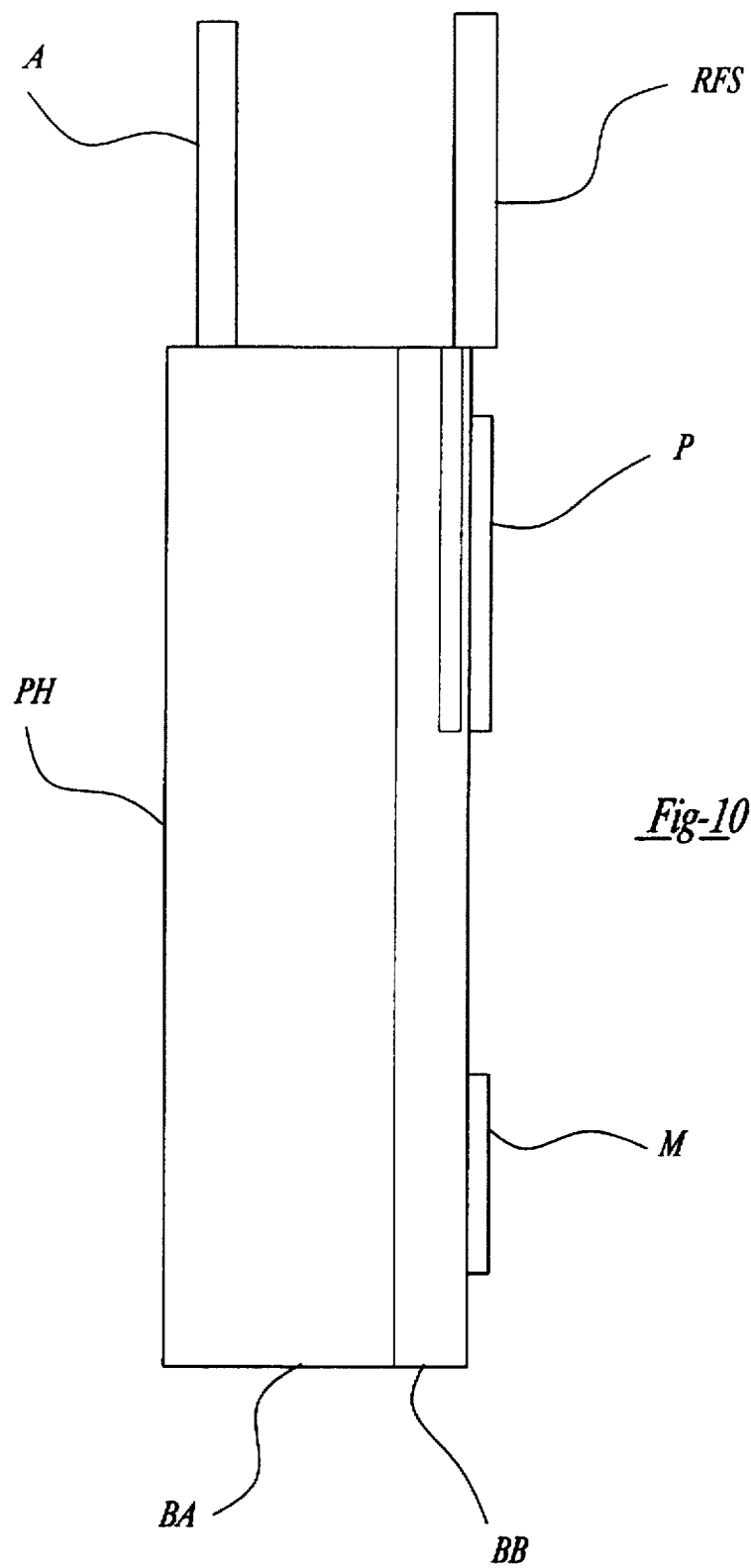
FIG. 10 shows one solution of the invention to increase the protection of the user against the irradiation from the radiophone.

FIG. 10 shows an embodiment of the invention which further increases the protection of the user. The box of PH consists of at least two parts BA and BB, from which BB is electrically conductive. RFS and BB forms a solid layer which reflects the power radiated by A away from the user and prevents a direct connection between the user and the radiative parts of PH. Depending on the wavelength and the other technical features of the device BB may be connected to the electrical ground of PH. BA may be from insulating material. The relationship between BA and BB is determined by the operational frequency, the constructions of the antenna means and the electronics.

There are other alternative designs of hinges H than those shown by FIG. 7. RFS may turn sidewise or the hinges may include constructions which generate more complicated movements of RFS.

The above only describes a few embodiments of the invention. The invention can be subjected to a plurality of modifications within the scope of the inventional concept defined in the appended claims.

I claim:

1. An apparatus for radio communication comprising: a main housing; a display; a keyboard, an antenna having an upper extending section located above said housing for radiating electromagnetic radiation; and a shield including a layer of electrically conductive material coupled at the operating frequency of the antenna to an electrical ground of the apparatus, said shield which under operational conditions is located between user and the radiating section of the antenna located above said housing thereby reducing electromagnetic irradiation of the user from said antenna; said shield being arranged to actuate a switch that controls functions of said apparatus; and said switch enabling the use of the apparatus only when the shield is in its shielding position.

2. An apparatus as defined in claim 1 further comprising said shield being movable between an upper shielding position and a lower resting position.

3. An apparatus as defined in claim 2 further comprising a headphone and the headphone being attached to the shield and being movable to its using position with the shield.

4. An apparatus as defined in claim 2 wherein said shield when in the resting position covers at least one of the display and keyboard of said apparatus.

5. An apparatus as defined in claim 2 further comprising said shield being mechanically connected to said antenna such that both can be raised to respective shielding and operating positions together.

6. An apparatus as defined in claim 2 further comprising said shield being slidable upward from its resting position to its shielding position.

7. An apparatus as defined in claim 2 further comprising said shield being hinged for movement between its lower resting position and its upward shielding position.

8. An apparatus as claimed in claim 1 further comprising said shield forming part of a protective cover of the apparatus.

9. An apparatus as claimed in claim 1 wherein said shield comprises a plastic sheet with a conductive layer inside.

10. An apparatus for radio communication comprising: a keyboard; a headphone; a display; an antenna having a section for radiating electromagnetic radiation; and a shield, said shield being movable between a resting position, in which it covers at least one of the headphone, display and keyboard of the apparatus, and an operatively shielding position extending upward which is between the user and the radiating section of the antenna such that the shield reduces electromagnetic irradiation of the user from said antenna; said shield being arranged to actuate a switch that controls functions of said apparatus; and said switch enabling the use of the apparatus only when the shield is in its shielding position.

11. An apparatus as defined in claim 10 wherein said shield includes electrically conductive material.

12. An apparatus as defined in claim 11 wherein said shield includes at least two layers with electrically different properties from each other.

13. An apparatus as claimed in claim 11 wherein said shield comprises a plastic sheet with a conductive layer inside.

14. An apparatus as claimed in claim 11 further comprising said shield forming part of a protective cover of the apparatus.

15. An apparatus as defined in claim 10 further comprising the shield being coupled at the operating frequency of the antenna to an electrical ground of the apparatus.

16. An apparatus as defined in claim 10 further comprising the headphone being attached to the shield and being movable to its using position with the shield.

17. An apparatus as defined in claim 16 further comprising the shield being hingable between the resting position and the shielding position.

18. An apparatus for radio communication, comprising: a housing, an antenna extendable from the housing for radiating electromagnetic radiation; and a shield for reducing electromagnetic irradiation of the user from said antenna; the apparatus having an operating configuration in which the shield is hinged for movement between a lower stored position and an upper raised position between the user and the antenna and the antenna is directed away from the user; said shield being arranged to actuate a switch that controls functions of said apparatus; and said switch enabling the use of the apparatus only when the shield is in its shielding position.

19. An apparatus as claimed in claim 18 further comprising a headphone.

20. An apparatus as defined in claim 19 further comprising said shield having a resting configuration in which it covers the headphone.

21. An apparatus as defined in claim 19 further comprising the headphone being attached to the shield and being movable to its upper raised position with the shield.

22. An apparatus as claimed in claim 18 further comprising a keyboard and a display.

23. An apparatus as defined in claim 22 further comprising said shield having a resting position in which it covers at least one of the keyboard and the display.

24. An apparatus as defined in claim 18 further comprising said shield being made from electrically conductive material.

25. An apparatus as defined in claim 24 further comprising said shield having at least two layers with electrically different properties from each other.

26. An apparatus as claim in claim 24 wherein said shield comprises a plastic sheet with a conductive layer inside.

27. An apparatus as claimed in claim 18 further comprising said shield forming part of a protective cover of the apparatus.

28. An apparatus as defined in claim 18 further comprising the shield being coupled at the operating frequency of the antenna to electrical ground of the apparatus.

* * * * *

UNITED STATES PATENT AND TRADEMARK OFFICE
CERTIFICATE OF CORRECTION

PATENT NO. : 5,787,340
DATED : July 28, 1998
INVENTOR(S) : Raimo Sepponen

It is certified that error appears in the above-identified patent and that said Letters Patent is hereby corrected as shown below:

Column 1, line 23, after "could" insert --lead--.

Column 1, line 56, after "In" delete "the".

Column 2, line 4, after "head" delete "in" and insert therefor --is--.

Column 2, line 18, after "along" delete "c" and insert therefor --G--.

Column 2, line 19, after "FIG." delete "3d" and insert therefor --3a--.

Column 2, line 47, before "microswitches" insert --enabling--.

Column 2, line 47, after "microswitches" insert --S operated by RFS--.

UNITED STATES PATENT AND TRADEMARK OFFICE
CERTIFICATE OF CORRECTION

PATENT NO. : 5,787,340
DATED : July 28, 1998
INVENTOR(S) : Raimo Sepponen

It is certified that error appears in the above-identified patent and that said Letters Patent is hereby corrected as shown below:

Column 3, line 63, after "slidable" delete "upward from" and insert therefor --between--.

Column 3, line 66, after "being" delete "hinged for movement" and insert therefor --hingeable--.

Column 3, line 67, after "between its" delete "lower" and after "and its" delete "upward".

Column 4, line 56, after "movable to" delete "its upper raised" and insert therefor --its using--.

Column 5, line 1, after "apparatus as" delete "claim" and insert therefor --claimed--.

Signed and Sealed this

Fifth Day of January, 1999

Attest:

Attesting Officer

Acting Commissioner of Patents and Trademarks